United States Patent [19]  [11] 3,949,220
Sparlin et al.  [45] Apr. 6, 1976

[54] METHOD FOR DETECTING AND LOCATING SAND PRODUCING ZONES IN FRIABLE, UNCONSOLIDATED SANDSTONE FORMATIONS OF SUBTERRANEAN FORMATIONS

[75] Inventors: Derry D. Sparlin; Walter H. Fertl, both of Ponca City, Okla.; Gary C. Young, Pinole, Calif.

[73] Assignee: Continental Oil Company, Ponca City, Okla.

[22] Filed: Oct. 4, 1974

[21] Appl. No.: 512,828

[52] U.S. Cl. ............................... 250/260; 250/259
[51] Int. Cl.² .......................................... G01V 5/00
[58] Field of Search ........................... 250/259, 260

[56] References Cited
UNITED STATES PATENTS

| | | | |
|---|---|---|---|
| 2,352,993 | 7/1944 | Albertson | 250/260 |
| 2,358,945 | 9/1944 | Teichmann | 250/260 |
| 2,810,076 | 10/1957 | Mardock | 250/260 |
| 3,503,447 | 3/1970 | Hamby, Jr. | 250/260 X |

*Primary Examiner*—Archie R. Borchelt
*Attorney, Agent, or Firm*—F. Lindsey Scott

[57] ABSTRACT

A method for locating and identifying sand producing zones in friable, unconsolidated sandstone formations of a subterranean reservoir traversed by a well bore. The method comprises the following steps:

a. introducing into said reservoir through said well bore, a radioactive material which is preferentially retained in the porous portions of the formation surrounding said well bore;

b. passing a radioactivity detection means through the well bore and recording the measurement of radioactivity of said reservoir;

c. returning the reservoir to production; and, d. passing a radioactivity detection means through said well bore and recording the measurement of radioactivity of said formation for a second time and correlating the measurements of radio activity of each measurement with measurement of depth to thus locate sand producing zones in said reservoir.

11 Claims, No Drawings

METHOD FOR DETECTING AND LOCATING SAND PRODUCING ZONES IN FRIABLE, UNCONSOLIDATED SANDSTONE FORMATIONS OF SUBTERRANEAN FORMATIONS

BACKGROUND OF THE INVENTION

1. Field of the Invention

The present invention relates to a method of logging subterranean reservoirs transversed by well bores. More specifically, this invention is directed to a method of logging subterranean reservoir formations employing radioactive well logging techniques and tracer injection techniques to locate and identify sand producing zones in said reservoirs.

2. Brief Description of the Prior Art

Sand-production problems and associated control methods have been recognized as a problem in the production of hydrocarbons for several decades. Sand production frequently occurs in friable, unconsolidated sandstones and appears to be directly related to rock strength of the reservoir, e.g. its degree of consolidation, and the magnitude of production rates.

Much effort has been directed to the effectiveness of remedial work in preventing the production of sand from such hydrocarbon producing reservoirs. Such methods include the injection of radioactive gravel tags during normal gravel packing procedures for the purpose of monitering the gravel pack efficiency. Another proposed method is the displacement efficiency and distribution of gravel in a reservoir rock using the "fra-Pac" method, such method employing radioactive tracer material. However, such preventive methods are being used indiscriminatively, in that many times the sections treated are unidentified and thus sections or zones are consolidated and treated which need no treatment at all. Such procedures are costly and are not always effective. Thus, the oil industry has long sought an economical, simple method to locate such sand producing zones prior to planned remedial work which would greatly increase the over-all efficiency of such work and at the same time drastically decrease total cost. However, until the present invention, there was no satisfactory method for accurately and inexpensively locating and identifying sand producing zones in friable, unconsolidated sandstone formations of a subterranean reservoir.

OBJECTS OF THE INVENTION

An object of the present invention is to provide a method for locating and identifying sand producing zones in friable, unconsolidated sandstone formations in subterranean reservoirs.

Another object of the invention is to provide an economical, simple method for determining the location of sand producing formations in subterranean reservoirs prior to remedial treatment of said employing a log-injection-log method.

Still another object of the present invention is to provide an improved, accurate technique, for determining the location of sand producing formations in subterranean reservoirs using radiological well logging techniques which avoid disadvantages of the prior art teachings.

SUMMARY OF THE INVENTION

According to the present invention, we have now discovered an improved method for locating and identifying sand producing zones in friable, unconsolidated sand stone formations present in subterranean reservoir formations penetrated by a well bore. More specifically, we have found an improved technique for locating and identifying such sand producing zones employing radio-active well logging techniques.

Specifically, the method for locating and identifying sand producing zones in a subterranean reservoir traversed by a well bore includes the sequential steps of:

a. introducing into said reservoir, through the bore hole of said well, a radioactive material which is preferentially retained in the porous portions of the formation surrounding said well bore;

b. passing a radioactivity detection means through the well bore and recording the measurement of radioactivity of said reservoir formation;

c. returning the reservoir to production;

d. passing a radioactivity detection means through the bore of said well and recording the measurement of radioactivity of said reservoir formation for a second time; and;

e. correlating the measurement of radioactivity of each measurement with measurements of depth to thus locate and identify sand producing zones.

The radioactive materials employed in the method of a present invention are produced by admixing an irradiated compound with a carrier liquid such as oil, water and combinations thereof.

DETAILED DESCRIPTION OF THE INVENTION

As previously stated, the present invention relates to a method for locating and identifying sand producing zones in friable, unconsolidated sandstone formations of subterranean reservoir formations traversed by a well-bore. When preparatory steps for utilizing the present invention are required, such do not comprise a portion of the invention but rather are conventional preparatory efforts to provide the necessary well head and bore equipment and fittings to receive an injection of extraneous fluids and to allow a detector device to be run in the well bore under conditions of pressure and production. This preparation would conventionally be the inclusion of a tubing inlet within the well bore and the installation of a survey flange with an offset at the wellhead to permit the running of a tool in the annulus of the well bore. Once the well has been prepared as described above it is desirable that a background log of the natural radioactivity of the producing formation adjacent the well bore be made by a suitable conventional detecting means, such as a Gamma Ray logging instrument. In many instances it is not necessary that a background survey be made although in some instances it is desirable that a background log be made to determine the natural radioactivity of the formation.

After obtaining the background log of the natural radioactivity of formations adjacent the well bore, the next facet of the invention is the selection of the radioactive material, the preparation of said material and the injection of same into the subterranean formation.

Once the desired radioactive material has been selected, the radioactive material is admixed with a suitable carrier liquid to form a resulting mixture. The term mixture as used herein is to be understood to include dispersions, both solid-in-liquid and liquid-in-liquid, and solutions. The amount of radioactive material employed in the mixture can vary widely but will generally range from about 0.01 pounds to 2 pounds per gallon of carrier liquid. Especially desirable results are obtained when the mixture contains from about 0.05 to 0.3 pounds of the radioactive material per gallon of carrier liquid.

The particular radioactive material and its solubility with respect to the carrier liquid employed to form the radioactive mixture will be dependent upon the characteristics of the formation under investigation and whether the radioactive mixture is a dispersion or a solution. However, in each instance, it should be noted that the carrier liquid can be any suitable liquid which is inert to the radioactive material, such as water, crude oil, refined oil, gelled water and gelled oil. As used herein, the term refined oil is meant to include suitable refined hydrocarbon products such as diesel fuel, kerosene, heavy coker gas oil, pale oil, pale oil extract and the like.

Materials which can readily be irradiated and employed as the radioactive constituent of the mixture to be injected into the subterranean formation are microballoons, fly ash, silica flour, thermosetting polymeric resins, polyacrylamides, and minusil, e.g. silicon dioxide powder. Examples of theremosetting polymeric resins which can be irradiated and employed in the present invention are phenolic resins, epoxy resins, urethane resins, furan resins and urea formaldehyde resins. When the radioactive constituent is injected as a particulate material, it is desirable that the median particle size of the particulate material injected be equal to from 20 to 100 percent of the median particle size of the formation sand. Such formation sand often has a median particle size varying from about 0.0016 to about 0.5 inches, although more typical median particle sizes are from about 0.005 to about 0.05 inches.

The irradiated mixture so formed is then injected into the formation under investigation through the well bore. An effective amount of the mixture is injected into the formation to penetrate the pore spaces in said formation to a distance of at least six inches from said well bore. Many times it is desirable to investigate the formation surrounding the well bore to a distance of from about one to five feet. However, normally the area of primary interest is that portion of said formation surrounding the well bore to a distance of from about one to two feet. In such instances, one must inject a sufficient amount of the irradiated mixture to penetrate the pore spaces of the area of the formation under investigation. Under normal formation conditions, one can readily achieve the dispersing of said irradiated mixture throughout the area of interest in said formation by employing from about 0.1 to 10 gallons of said mixture per foot of vertical subterranean formation being investigated. However, care must be exercised to prevent reduction of permeability of the formation by more than about 25 percent, preferably not more than 10 percent.

While it is possible to investigate the formation surrounding the entire length of the well bore, such is not the norm. The more likely approach will be investigate only portions of the subterranean formation at predetermined depths. Generally it is desirable that the area of said well bore adjacent the area of said formation under investigation be temporarily sealed off by any suitable means, such as packer means, so that the irradiated mixture can be forced into the desired area of said formation. Sufficient pressure must be supplied to the irradiated mixture to overcome formation pressure and to insure dispersement of said mixture into said formation as desired.

Often it is desirable to assist the dispersement of the irradiated mixture into the formation by injecting into said formation, through the well bore, an effective amount of dispersing agent. While the amount of dispersing fluid can vary widely, and will be dependent upon the structural characteristics of the formation and the particular irradiated mixture empolyed, generally said dispersing fluid is employed in an amount of from about 1 to 10 barrels per foot of vertical subterranean formation being treated. Examples of suitable dispersing fluids are water, refined oils, crude oils, gelled water, gelled crude oil, and gelled refined oil. The term refined oils has been previously defined herein.

When desirable a de-emulsifying surfactant can be incorporated into said dispersing fluid. While the amount of such surfactant can vary widely, desirable results are obtained when from about 0.05 to 5 weight percent of said surfactant is employed. Such de-emulsifying surfactants are well known in the art and include, A. Nonionic:
  I. Products obtained by autocondensation of various fatty matter and their derivatives with ethylene oxide, propylene oxide, glycols, or glycerols:
    a. a fatty acid plus ethylene oxide or glycerol, such as palmitic acid plus 5 moles ethylene oxide or glycerol monostearate;
    b. an alcohol plus ethylene oxide, such as hydroabietyl alcohol plus 15 moles ethylene oxide;
    c. an ester of aldehyde plus ethylene oxide.
    d. an amide or amine plus ethylene oxide, such as diethanolamine plus 15 moles ethylene oxide.
  II. Products obtained by condensation of phenolic compounds having lateral chains with ethylene or propylene oxide. Examples are disecbutyl phenol plus 10 moles ethylene oxide and octyl phenol plus 12 moles ethylene oxide.
B. Cationic:
  I. Neutralization product of primary, secondary, or tertiary amine with an acid such as trimethyl octyl ammonium chloride, lauryl dimethyl benzyl ammonium chloride and the like, commonly referred to as quaternary ammonium chlorides.
C. Anionic:
  I. Alkyl aryl sulfonates such as ammonium isopropyl benzene sulfonate;
  II. Fatty Alcohol sulfates such as sodium 2-methyl-7-ethyl-4 hendecyl sulfate;
  III. Sulfated and sulfonated amides and amines such as sodium N-methyl-N-oleyl taurate;
  IV. Sulfated and sulfonated esters and ethers such as dioctyl sodium sulfo succinate;
  V. Alkyl sulfonates such as sodium dodecyl sulfonate.
D. Ampholytic:
  I. Molecules where the molecules as a whole forms a zwitterion, such as cetylaminoacetic acid.

After the passage of an amount of time sufficient to insure that the irradiated mixture has been injected into the formation, the sealing means employed to seal off the area under investigation, along with any mixture injector means, are withdrawn from the well bore. A radioactivity detection means is again passed through the well bore to record the measurement of radioactivity of the mixture treated formation. The same type of radioactivity detection means employed to obtain the base log or reference log is also used to record the measurement of radioactivity of the mixture treated formation to facilitate comparison of the measurements.

The treated formation is then returned to normal production by means of natural or mechanical forces. The radioactive constituent of the mixture, which has been dispersed throughout the area of the formation under investigation will be produced from those areas of the formation which are the sand producing zones in friable, unconsolidated sandstone formations of the subterranean reservoirs. Such sand producing formations are detected by the use of subsequent logging data obtained on the formation after the well has been returned to normal production. This logging data can be obtained at intermittent intervals of time by passing a radioactivity detection means through the well bore concurrently with the normal production in order to obtain logging data under actual conditions of normal production. By comparing the logs after production has been resumed with the base log and the log of the treated formation, one can readily detect, by a decrease in the radioactivity of the formation, the location of the sand producing protions of said formation.

As previously stated, the mixture containing the radioactive constituent which is employed in the method of the present invention can be either in the form of a dispersion or a solution. Where the mixture is a solution, one may desire to precondition the subterranean formation prior to injecting said solution. Such preconditioning step willl facilitate the adherance of the radioactive constituent to the formation. To precondition the formation one can inject into said formation, prior to the injection of irradiated solution, from about 1 to 10 barrels of a formation conditioning agent per foot of vertical formation being treated. Any suitable conditioning agent can be employed which is compatable with the radioactive constituent of the solution and which will function to clean the surface of the formation under investigation of constituents which are not compatable with said radioactive constituent. Examples of such conditioning agents are alcohols containing from 1 to about 10 carbon atoms per molecule, ethers, refined oils, including kerosene, diesel oil, heavy coker gas oil, pale oil, pale oil extract, and the like.

Examples of suitable ethers are alkyl ethylene glycol monoethyl ethers, such as butyl ethylene glycol monoethyl ether, carbitols and the like.

When desirable, from about 0.05 to 5 weight percent of a surface active agent can be incorporated into said conditioning agent. Such surface active agents are well known in the art.

A reference book which describes many types of surfactants suitable as foaming agents is "Surface Active Agents and Detergents", Volumes I and II, by Schwartz et al., Interscience Publishers. In addition, the de-emulsifying surfactants previously described can be employed.

Once the formation has been pre-conditioned, the solution containing the radioactive constituent is injected as previously described. Thereafter, if determined desirable to assist the dispersement of the radio active constituent throughout the area of interest of the formation, one can inject from about 1 to 10 barrels of a dispersement agent, such being material as previously described. Logging data is then obtained, the well returned to production and subsequent logging data obtained for comparison to locate areas of sand production as previously described.

In order to better illustrate the method of the present invention the following examples are given. However, it is apparent that the method of the present invention is susceptible to a variety of applications and embodiments and that the example hereinafter is given merely for illustrative purposes only showing the operability and applicability of the present invention.

EXAMPLE I

A reservoir containing a producing well, which is suspect of sand producing zones, is equipped at the well bore with a tubing inlet in order to inject the desired radioactive materials into the formation, and the well head is provided with a survey flange having an offset opening to permit the running of a Gamma Ray tool in the tubing casing annulus. An initial background log is run with a Gamma Ray logging instrument to determine the natural radioactivity present in the formation. The tubing inlet is provided with a coil tubing which extends to the bottom of the zone to be treated and which is believed to encompass the area suspect as producing sand. Approximately one barrel per foot of the formation being treated of filtered, irradiated 0.3% polyacrylamide aqueous solution (approximately 10 c.p. viscosity), is injected into the formation to be treated at matrix treating rates and pressure. As the polyacrylamide solution is injected the coiled tubing is slowly raised so that the tagged polymer can be dispensed evenly into the zone of investigation. Once the radioactive material has been dispersed throughout the formation, a volume of 5 barrels of gelled diesel oil per foot of formation is injected at the same rate as the radioactive material was injected as the coiled tubing is slowly lowered to the bottom of the treating zone. The gelled diesel oil contains a deemulsifying surfactant which is present in the amount of about 0.5 percent by weight.

Upon completion of the injection of the radioactive material and the gelled diesel oil into the formation, the well is then logged a second time with a Gamma Ray logging instrument. After a sufficient time has passed to allow complete adsorption of the radio active material onto the sand particles of the formation, the well is returned to normal production. At a predetermined time a third log is obtained employing the Gamma Ray logging instrument, such data, when being compared to the log information obtained by the first and second logs indicates and defines where sand movement in the formation is occurring since the radioactivity will be reduced in such areas of the reservoir. Once such areas have been located, one can readily employ remedial procedures to seal off such sand producing zones and thus improve the longevity and the effectiveness of oil recovery from the formation.

EXAMPLE 2

A well is drilled to a depth of 14,026 feet and a casing cemented in the wellbore to a depth of 12,119 feet. It is suspected that some portions of the uncased wellbore; i.e., below 12,119 feet, will produce sand, thus requiring some means of control, while other portions of the wellbore will be consolidated and will not produce sand. The detection of the sand-producing zones by the method of the present invention is as follows:

a. A radioactivity tracer survey is taken.

b. A tubing and packer are lowered into the well so that the bottom of the tubing is near the bottom of the well bore; i.e., approximately 14,025 feet, and the packer is near the bottom of the casing; i.e., approximately 12,100 feet.

c. The following fluids are circulated down the tubing, allowing the mud to come out the annulus; 3,800 gallons of isopropanol in diesel oil; 1,900 gallons of a 0.1 weight percent solution of irradiated polyacrylamide in 2.0 weight percent aqueous potassium chloride salt solution; 3,800 gallons of 2.0 weight percent aqueous potassium chloride salt solution, and mud.

d. The materials are circulated until all of the isopropanol in diesel oil mixture is just above the packer in the tubing-casing annulus.

e. The packer is then set and additional mud is circulated to force the irradiated polyacrylamide solution into the formations surrounding the well bore.

f. The packer is opened and additional mud is circulated.

g. A second radioactivity tracer is run.

h. The well is put on production.

i. As soon as the first traces of sand are noticed, a third radioactivity tracer is run.

A comparison of the first, second, and third radioactivity tracer surveys will indicate the presence and location of sand producing areas, i.e., those areas which have a reduced radioactivity level as shown particularly by comparison of the second and third radioactivity tracer surveys.

It is to be understood that the above description is illustrative rather than limiting in nature since many deviations and variations are possible within the spirit of the invention.

Having thus described the invention, we claim:

1. A method for locating and identifying sand producing zones in friable, unconsolidated sandstone formations of a subterranean reservoir traversed by a well bore which comprises the sequential steps of:
   a. introducing into said reservoir through said well bore, a mixture containing a radioactive material which is preferentially retained in the porous portions of the formation surrounding said well bore;
   b. passing a radioactivity detection means through the well bore and recording the measurement of radioactivity of said reservoir;
   c. returning the reservoir to production;
   d. passing a radioactivity detection means through said well bore and recording the measurement of radioactivity of said formation for a second time; and,
   e. correlating the measurements of radioactivity of each measurement with measurement of depth to thus locate sand producing zones in said reservoir.

2. The method of claim 1 wherein said mixture contains from about 0.1 to 1 pound of said radioactive material per gallon of carrier fluid.

3. The method of claim 2 wherein said radioactive material is an irradiated compound selected from the group consisting of micro balloons, fly ash, silica flour, thermosetting polymeric resins, polyacrylamides and minusil; and said carrier fluid is selected from the group consisting of water, crude oil, refined oil, gelled water and gelled oil.

4. The method of claim 3 wherein said mixture is injected into said formation in an amount of from about 0.1 to 10 gallons of said mixture per foot of vertical subterranean formation being treated.

5. The method of claim 4 wherein said mixture contains from about 0.05 to 0.3 pounds of said radioactive material per gallon of said carrier fluid.

6. The method of claim 4 which includes the step of injecting into said formation, through said well bore subsequent to the injection of mixture, from about 1 to 10 barrel per foot of vertical subterranean formation being treated, a dispersing agent selected from the group consisting of water, crude oil, refined oils, gelled water, gelled oil and gelled refined oils.

7. The method of claim 6 wherein said dispersing agent contains from about 0.05 to 5 weight percent of a deemulsifying surfactant.

8. The method of claim 6 which includes the step of injecting into said formation, through said well bore prior to the injection of said mixture, from about 1 to 10 barrel per foot of vertical subterranean formation being treated, a pre-conditioning agent selected from the group consisting of alcohols containing from 1 to about 10 carbon atoms per molecule, ethers and refined oils.

9. The method of claim 8 wherein said pre-conditioning agent contains from about 0.05 to 5 weight percent of a surface active agent.

10. The method of claim 7 wherein said irradiated mixture is an aqueous solution containing 0.3 weight percent irradiated polyacrylamide, and said dispersing agent is gelled diesel oil containing about 0.5 weight percent de-emulsifying surfactant.

11. The method of claim 1 wherein a radioactivity detection means is passed through the wellbore to measure the naturally occurring radioactivity in said reservoir prior to the injection of said radioactive material of (a).

* * * * *